(12) United States Patent
Antoine et al.

(10) Patent No.: US 9,150,120 B2
(45) Date of Patent: Oct. 6, 2015

(54) FASTENING CLIP

(71) Applicant: TRW Automotive Electronics & Components GmbH, Radolfzell (DE)

(72) Inventors: Herve Antoine, Obersoultzbach (FR); Michel Kuhm, Ingwiller (FR); Emmanuel Ouine, Bischwiller (FR)

(73) Assignee: TRW AUTOMOTIVE ELECTRONICS & COMPONENTS GMBH, Radolfzell (DE)

( * ) Notice: Subject to any disclaimer, the term of this patent is extended or adjusted under 35 U.S.C. 154(b) by 226 days.

(21) Appl. No.: 13/870,213

(22) Filed: Apr. 25, 2013

(65) Prior Publication Data

US 2013/0291351 A1    Nov. 7, 2013

(30) Foreign Application Priority Data

May 4, 2012    (FR) ...................................... 12 54131

(51) Int. Cl.
*F16B 21/07* (2006.01)
*B60N 2/015* (2006.01)
*B60N 2/12* (2006.01)
*B60N 2/60* (2006.01)
*B60N 2/01* (2006.01)

(52) U.S. Cl.
CPC ............... *B60N 2/015* (2013.01); *B60N 2/012* (2013.01); *B60N 2/0155* (2013.01); *B60N 2/12* (2013.01); *B60N 2/6027* (2013.01); *F16B 21/075* (2013.01); *F16B 21/078* (2013.01); *Y10T 24/44026* (2015.01)

(58) Field of Classification Search
CPC ............. B60N 2/01516; B60N 2/0155; B60N 2/01541; B60N 2/01508; B60N 2/015; B60N 2/01558; F16B 21/073; Y10T 24/44026; Y10T 24/45775; Y10T 24/44014
USPC ..................... 248/503.1; 297/463.1
See application file for complete search history.

(56) References Cited

U.S. PATENT DOCUMENTS

| | | | | | |
|---|---|---|---|---|---|
| 209,903 | A | * | 11/1878 | Lane | 187/349 |
| 2,331,060 | A | * | 10/1943 | Turner | 248/500 |
| 3,915,493 | A | * | 10/1975 | Brown | 296/63 |
| 3,924,892 | A | * | 12/1975 | Geier | 297/440.22 |

(Continued)

FOREIGN PATENT DOCUMENTS

| | | |
|---|---|---|
| FR | 2946925 | 6/2009 |
| FR | 2 946 925 | 12/2010 |

(Continued)

*Primary Examiner* — Jack W Lavinder
(74) *Attorney, Agent, or Firm* — Tarolli, Sundheim, Covell & Tummino LLP

(57) ABSTRACT

A fastening clip (16) for fastening a bracket (20), in particular a metal bracket in a vehicle, which is adapted to be inserted into an opening (14) of a body part (10) and to be fixed therein, includes a housing (22) having an insertion opening (26) and an elongated receiving space (24) for the bracket (20), a latching element (42) being provided in the receiving space (24), which is adapted to be moved resiliently from a holding position in which the latching element (42) holds the bracket (20) in the receiving space (24), to a release position in which the bracket (20) can be inserted into the receiving space (24) or can be pulled out therefrom, and to a fixing position, corresponding holding elements (46, 48) which fix the latching element (42) in the fixing position being provided in the receiving space (24) and on the latching element (42).

14 Claims, 3 Drawing Sheets

(56) References Cited

U.S. PATENT DOCUMENTS

| | | | |
|---|---|---|---|
| 4,707,033 A * | 11/1987 | Stenz et al. | 297/452.1 |
| 4,742,984 A * | 5/1988 | Cote et al. | 248/503.1 |
| 4,822,092 A * | 4/1989 | Sweers | 296/63 |
| 4,916,778 A * | 4/1990 | Iguchi | 24/458 |
| 5,533,237 A * | 7/1996 | Higgins | 24/289 |
| 5,606,784 A * | 3/1997 | Hamamoto | 24/662 |
| 5,649,783 A * | 7/1997 | Ichikawa et al. | 403/386 |
| 5,664,839 A * | 9/1997 | Pedronno et al. | 297/378.13 |
| 5,788,314 A * | 8/1998 | Hayes et al. | 296/63 |
| 5,890,831 A * | 4/1999 | Kato | 403/329 |
| 6,145,173 A * | 11/2000 | Suzuki et al. | 24/662 |
| 6,357,814 B1 * | 3/2002 | Boisset et al. | 296/65.03 |
| 6,375,245 B1 * | 4/2002 | Seibold et al. | 296/65.03 |
| 6,474,616 B2 * | 11/2002 | Yamada et al. | 248/503.1 |
| 6,796,006 B2 * | 9/2004 | Hansen | 24/297 |
| 7,717,488 B2 * | 5/2010 | Takahana | 296/65.03 |
| 7,740,432 B2 * | 6/2010 | Harada | 411/45 |
| 2002/0050551 A1 * | 5/2002 | Yamada et al. | 248/500 |
| 2008/0012380 A1 * | 1/2008 | Takahana | 296/65.03 |
| 2012/0205959 A1 * | 8/2012 | Pacolt | 297/463.1 |
| 2014/0327253 A1 * | 11/2014 | Lee et al. | 292/341.12 |

FOREIGN PATENT DOCUMENTS

| | | |
|---|---|---|
| WO | 2005076963 | 8/2005 |
| WO | 2007105062 | 9/2007 |
| WO | 2007105062 | 9/2007 |
| WO | 2010/149922 | 12/2010 |

* cited by examiner

FASTENING CLIP

RELATED APPLICATION

This application claims priority from French Patent Application No. 12 54131, filed May 4, 2012, the subject matter of which is incorporated herein by reference.

BACKGROUND OF THE INVENTION

The invention relates to a fastening clip for fastening a bracket, in particular a metal bracket, in a vehicle.

For a reversible fastening of components, of seat benches for example, fastening clips are used in the automotive field, which are fastened to the vehicle body. Attached to the component to be fastened is a projection, for example a U-shaped metal bracket which can be inserted into the fastening clip and fixed therein, for example by means of a latching connection. The purpose of the fastening clip, on the one hand, is to reliably hold the bracket and thus the component so that an unintentional detaching, for example by vibrations or shocks, is securely excluded. On the other hand, the bracket should be adapted to be removed from the fastening clip in a nondestructive manner for disassembling the component with low expenditure.

Document WO 2007/105062 A1 discloses a fastening clip having two resilient latching tabs which are directed towards each other and between which the bracket can be inserted. Owing to the bracket, these latching tabs are pressed apart from each other when the bracket is inserted and spring back into their initial position when the bracket has been completely inserted. The drawback of this fastening clip is that the latching elements cannot be pressed again apart from each other or only with high effort to be able to disassemble the bracket and thus the component.

A further fastening clip is known from document FR 2 946 925 A1. This fastening clip has a latching element behind which the bracket can latch. For securing the latching element against an unintentional opening, this fastening clip includes a securing element which fixes the latching element in the latched position. In this fastening clip, an accidental detaching of the bracket can however occur due to vibrations and in particular to tension forces onto the bracket.

SUMMARY OF THE INVENTION

The object of the invention is to provide a fastening clip for a bracket, which ensures a reliable fastening of the bracket and however permits a simple disassembling of the bracket.

To achieve the object, a fastening clip is provided for fastening a bracket, in particular a metal bracket in a vehicle, the fastening clip being adapted to be inserted into an opening of a body part and fixed therein. The fastening clip includes a housing having an insertion opening and an elongated receiving space for the bracket. A latching element is provided in the receiving space and can be moved in a resilient manner from a holding position in which the holding element holds the bracket in the receiving space, to a release position in which the bracket can be introduced into the receiving space or can be pulled out therefrom, and to a fixing position. Corresponding holding elements which fix the latching element in the fixing position are provided in the receiving space and on the latching element.

Due to the fastening in the fixing position, the latching element cannot be moved to the release position in which the bracket can be extracted from the receiving space. The bracket is thus reliably held in the fastening clip. The latching element is for example configured such that it is moved to the fixing position in case of a defined load, for example a tensile load on the bracket, so that an additional securing is realized by the holding elements when this load occurs. If the bracket is unloaded, the latching element can be moved back resiliently to the holding position from which the latching element can simply be shifted to the release position to detach the bracket. For detaching the fastening clip or the bracket, the latching element must thus first be moved back to the holding position from which a shifting to the release position is possible.

The latching element is for example movable contrary to the direction of insertion from the holding position to the fixing position, so that the latching element is moved to the fixing position in case of a tensile load on the bracket and the fastening clip or the latching element is secured. In this embodiment, the holding elements are arranged one behind the other in the direction of insertion and overlap at least partially in the direction of insertion in the holding position and in the fixing position, such that they can come into engagement when they are moved from the holding position in the fixing position, and can fix the latching element.

Preferably, a hook is provided on at least one holding element, the hook projecting towards the other holding element and engaging the respective other holding element when the latching element is in the fixing position. The hook is configured so as to extend parallel to the direction of movement of the latching element from the holding position to the fixing position, as a result of which it engages the respective other holding element when the holding elements are moved towards each other. The hook thus engages the respective other holding element such that the latching element is fixed and can be moved back to the holding position merely contrary to the direction of movement. A movement of the latching element to the release position is thus in particular excluded by the hook. The hook thus ensures a secure fastening of the bracket as the holding elements can be coupled by this hook such that the latching element is fastened in a fixed position with respect to the housing. A corresponding counter structure is preferably provided on the other holding element, for example an opening or a receiving means for the hook.

It is however also conceivable that both holding elements are provided with hooks which are in particular directed towards each other and engage each other in the fixing position of the latching element, or engage the respective other holding element. By an appropriate choice of the hook geometry, it is thus possible to improve the fixing of the latching element in the fixing position.

The latching element can be moved resiliently from the holding position to the release position or the fixing position, respectively. To this end, a flexible support of the latching element in the housing is necessary. This can be produced, for example, by means of a web to which the latching element is resiliently and/or pivotally mounted, the web being in particular adapted to be provided in the region of the insertion opening. The latching element is thus fastened to the insertion opening such that an unintentional shifting of the latching element due to a movement of the bracket is prevented. The web can for example be configured such that the latching element can be pivoted in a resilient manner about the longitudinal axis or about a pivoting axis extending transversely to the longitudinal axis of the receiving space.

Introducing surfaces, in particular introducing bevels which permit a easier insertion of the bracket into the housing may be provided on the latching element or on the housing, respectively.

The latching element can for example be moved from the holding position to the release position, or from the fixing position to the holding position by means of a tool. To this end, the latching element is preferably provided with a receiving means for a tool which can be inserted between the body part and the component, for example, to shift the latching element.

The housing can be entirely closed in the circumferential direction and at the end opposite the insertion opening, so that the housing is completely closed with respect to the body. in case the fastening clip is inserted into a body opening, the fastening clip can tightly seal the opening so that it is possible to prevent dirt or liquids from penetrating the opening.

In order to obtain a better sealing of the opening in the body, a surrounding flange which projects from the housing and which is provided with a seal surrounding in the circumferential direction is preferably provided on the insertion opening. This seal rests against the edge of the opening or against the surface of the body part and tightly seals the fastening clip with respect to the body part.

Additional resting surfaces against which the bracket rests can be provided on the insertion opening of the housing, so that the insertion depth into the receiving space is limited. They additionally serve to minimize noise as the bracket is held free of play between the latching element and the resting surface and cannot rattle. Additionally, the resting surfaces may be configured as spacer elements so that there is sufficient room between the component and the body to insert a tool, for example, by means of which the latching element can be moved.

In order to prevent an additional generation of noise due to vibrations, additional damping elements made of a soft plastic material may be provided on the housing. They can be arranged so as to be positioned between the fastening clip and the bracket, or between the fastening clip and the body and respectively, avoid the generation of noise therebetween due to vibrations or shocks. Furthermore, a play of the fastening clip in the vehicle can be reduced by such damping elements which elastically yield, so that a better seat of the fastening clip in the body is possible.

These damping elements can be integrated at least partially into the wall of the housing so that they do not project or only slightly project from the outer wall of the fastening clip.

The fastening clip is for example manufactured using an injection-molding method. In case the additional damping elements are partially integrated into the wall of the housing, the fastening clip is for example manufactured using a two-component injection molding method so that the damping elements are integrally joined to the housing or the remaining fastening clip.

To fasten the fastening clip in the housing, fastening elements, in particular latching projections which can latch on the rear of the body part are preferably provided on the outer surface of the housing.

BRIEF DESCRIPTION OF THE DRAWINGS

Further advantages and features will become apparent from the description below in connection with the accompanying drawings, in which.

DESCRIPTION OF EXEMPLARY EMBODIMENT

Figure 1:
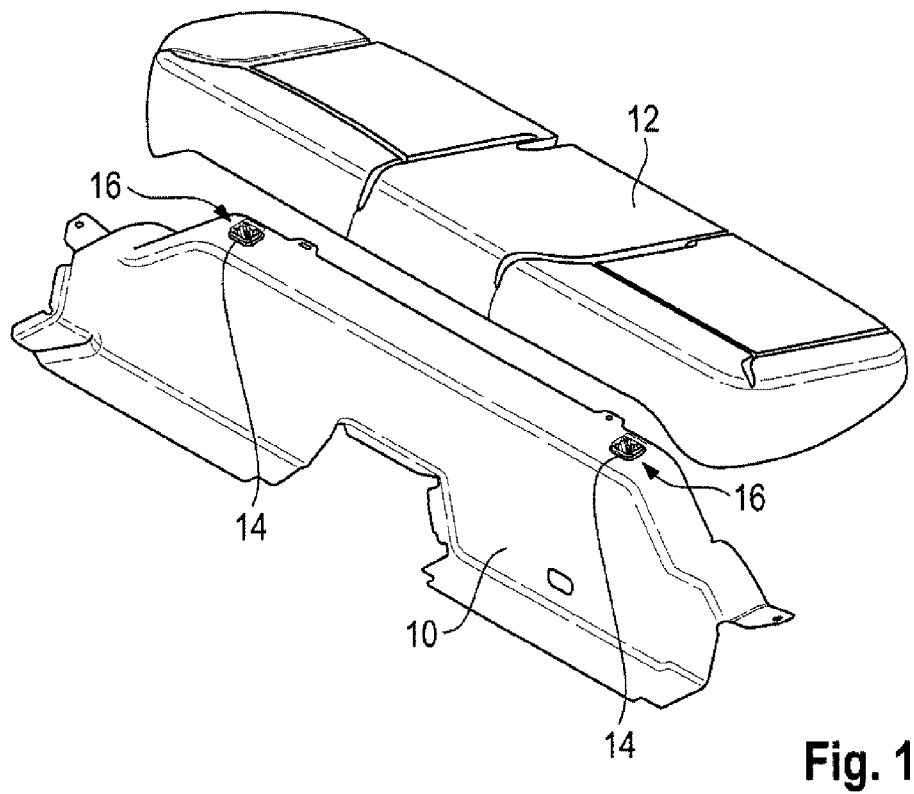
FIG. 1 shows a body part having fastening clips according to the invention and a seat bench fastened to the body part.

FIG. 1 shows a body part 10 to which a component 12, here a rear seat bench of a vehicle is fastened. To this end, the body part 10 is provided with openings 14, a fastening clip 16 being inserted into each opening and being fixed therein.

Figure 2:
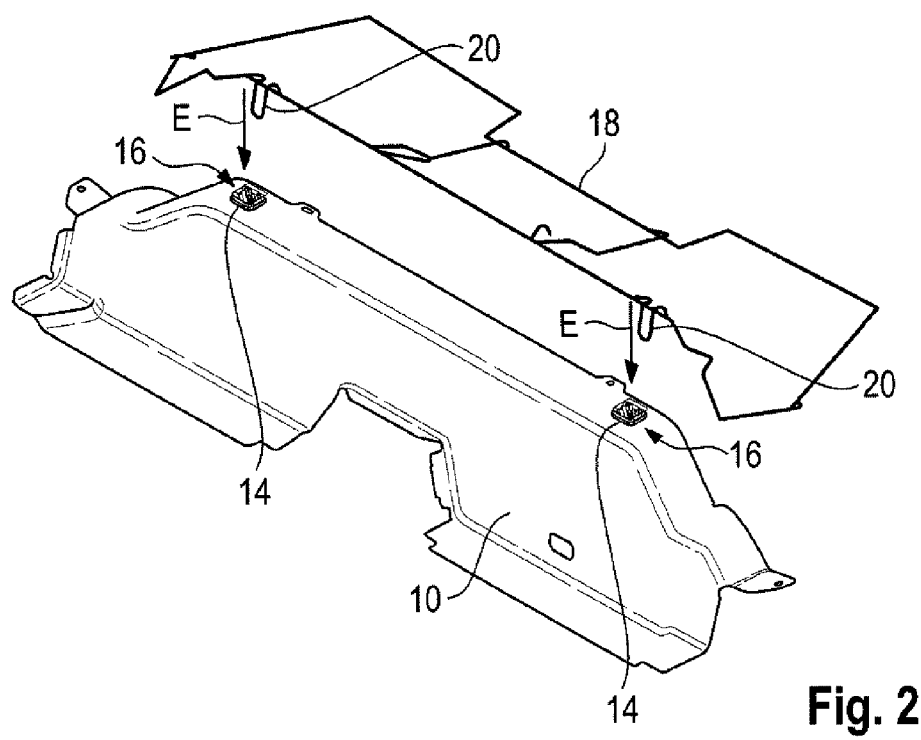
FIG. 2 shows the body part of FIG. 1 with the support frame of the seat bench of FIG. 1.
Figure 3:
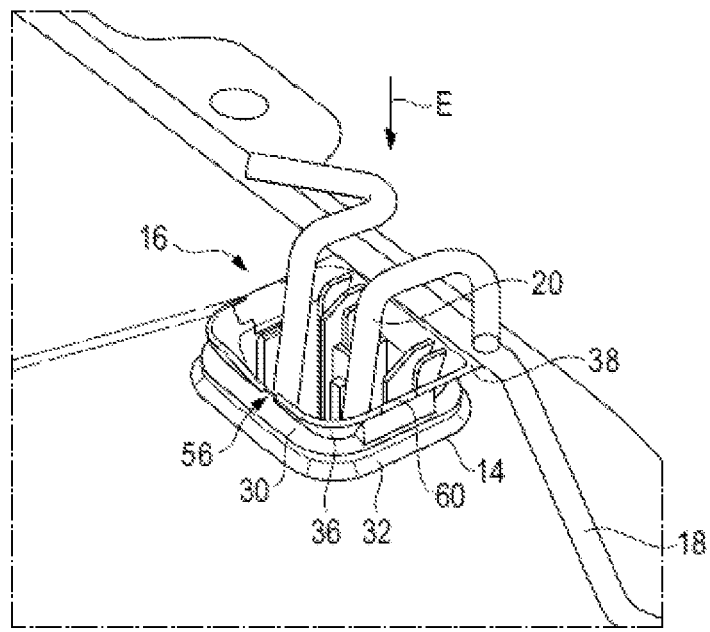
FIG. 3 shows a detailed view of the body part with the support structure of the seat bench.

As can be seen in FIG. 2, the component 12 has on the rear side a metal support structure 18 on which two projecting U-shaped brackets 20 are provided. These brackets 20 are inserted in the fastening clips 16 in the direction of insertion E and fixed therein to fasten the component 12 (see also FIG. 3).

Figure 4:
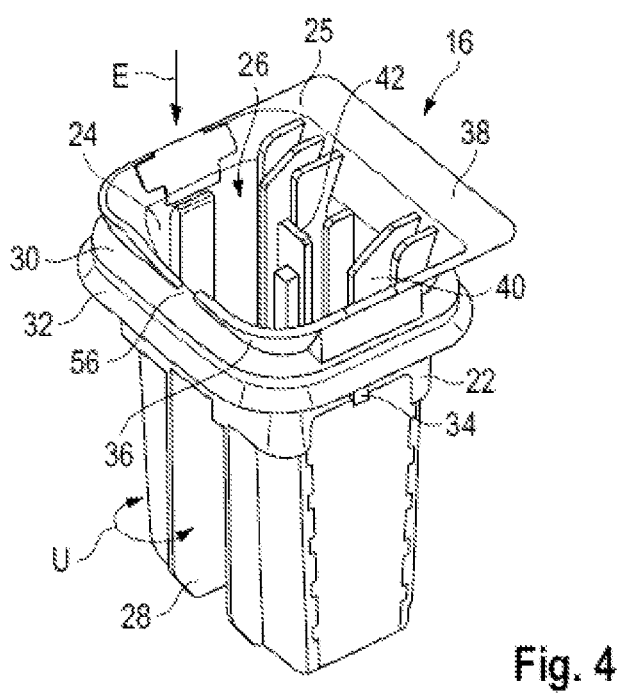
FIG. 4 shows a perspective view of a fastening clip according to the invention.
Figure 5:
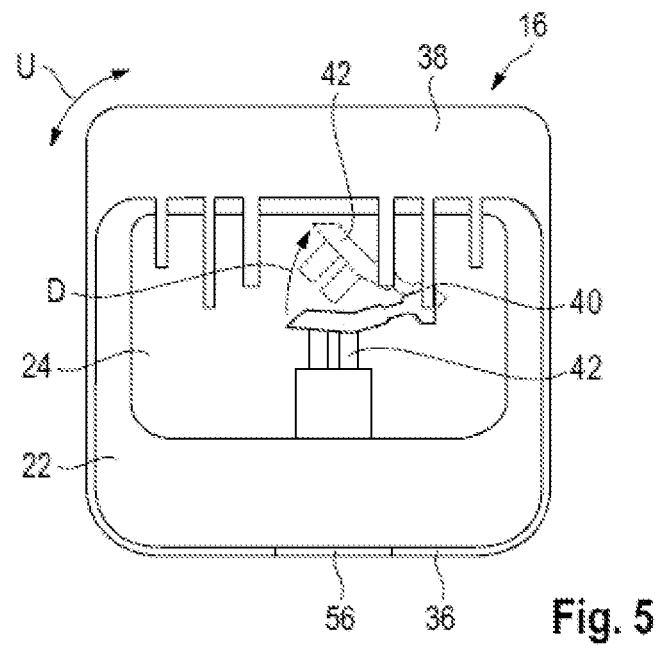
FIG. 5 shows a top view on the fastening clip of FIG. 4.
Figure 6:
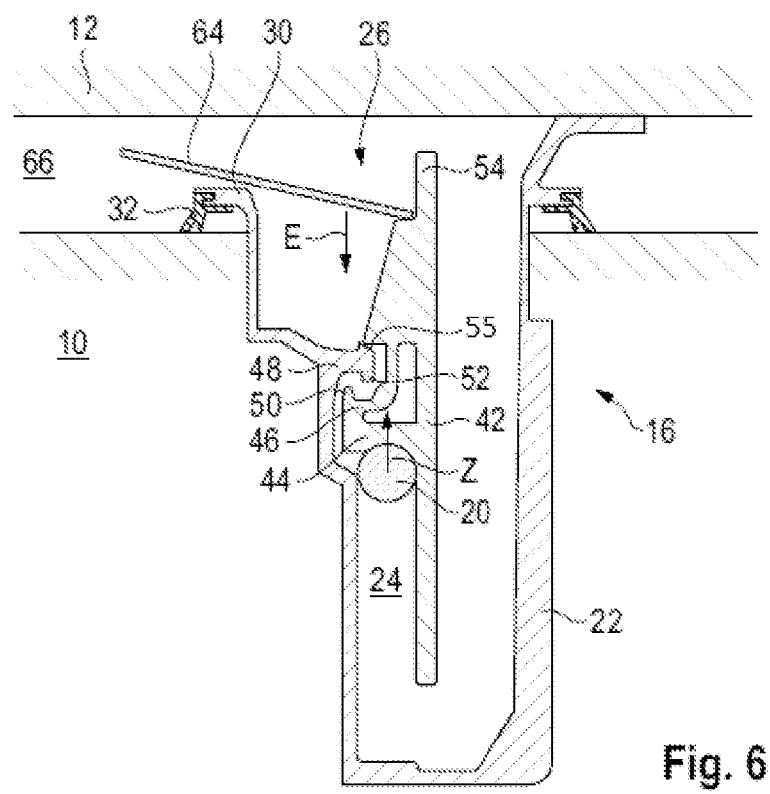
FIG. 6 shows a sectional view through the fastening clip of FIG. 4.

As can be seen in FIGS. 4 to 6, the fastening clip 16 has a housing 22 which in the embodiment shown here is configured substantially rectangular and defines an elongated receiving space 24 into which the bracket 20 can be inserted in the direction of insertion E. Depending on the shape of the bracket 20 and the mounting conditions, the housing 22 can however also have a different shape.

The housing 22 has at a first end 25 an insertion opening 26 into which the bracket 20 can be inserted. The housing 22 is entirely closed in the circumferential direction U and at the end 28 opposite the insertion opening 26, so that the housing 22 forms, so to speak, a tightly sealing pot.

A perpendicularly projecting flange 30 on which a surrounding seal 32 is provided is arranged at the insertion opening 26. Provided on the outer surface of the housing 22 are furthermore fastening elements 34, here latching elements, for mounting the fastening clip 16 in the opening 14 of the body part 10.

The fastening clip 16 is inserted into the opening 14 via the end 28 until the flange 30 or the seal 32 rests against the surface of the body part 10 and the fastening elements 34 latch on the rear side of the body part 10. As the housing 22 is entirety closed with respect to the body part 10, the opening 14 is entirely closed by the housing 22 of the fastening clip 16 and the surrounding seal 32, so that dirt or humidity is prevented from penetrating into the opening 14.

The fastening clip 16 further has in the region of the insertion opening 26 introduction surfaces 36, 38 which serve to center the bracket 20 upon insertion into the receiving space 24.

A web 40 which extends in the direction of insertion E and to which a latching element 42 is held in a resilient manner is provided in the receiving space 24 (cf. in particular FIG. 5). The latching element 42 can be resiliently pivoted in a pivoting direction D about the web 40.

As can be seen in FIG. 6, the latching element 42 extends in the direction of insertion E into the receiving space 24 and includes a latching nose 44 on which the bracket 20 can latch.

In FIGS. 5 and 6, the latching element 42 is respectively shown in a holding position. The bracket 20 is inserted in the receiving space 24 and engages behind the latching nose 44 so that it is held in the receiving space 24.

For inserting the bracket 20, the latching element 42 is pivoted clockwise in the pivoting direction D with respect to FIG. 5 to a release position (dashed line), in which the receiving space 24 is released and the bracket 20 can be inserted between the housing 22 and the latching element 42. When the bracket 20 is inserted far enough into the receiving space 24, the latching element 42 can spring back to the holding position so that the bracket 20 latches on the rear side of the latching nose 44 and is securely held in the fastening clip 16.

In the present case, the pivoting axis about which the latching element 42 is pivoted is arranged in the direction of insertion E of the bracket 20 or in the longitudinal direction of the housing 22, respectively. The pivoting axis can however also be arranged in a different direction depending on the shape of the housing 22 or on the direction of insertion of the bracket 20.

As can be seen in FIG. 6, a sliding surface 55 against which the latching element 42 rests is additionally provided on the housing 22 above the holding element 46. When a compression force is exerted in the direction of insertion E on the latching element 42, for example when a bracket is inserted, the latching element 42 is shifted in the direction of insertion E and the sliding surface 45 is shifted transversely thereto, so that the receiving space 24 is released for the bracket 20.

As can be seen in FIG. 5, additional holding elements 46, 48 each having a hook 50, 52 are provided on the housing 22 and on the latching element 42. In the holding position shown in FIG. 5, in which the bracket 20 is held on the latching element 42, the holding elements 46, 48 are arranged one behind the other in the direction of insertion E and overlap at least partially. However, in the holding position, the holding elements 46, 48 do not engage each other.

In case a tension force Z is applied onto the bracket 20 contrary to the direction of insertion E, the latching element 42 is slightly pulled out from the receiving space 24 contrary to the direction of insertion E. The hooks 50, 52 thus come into engagement with each other or engage the respective other holding element 46. 48.

In this fixing position, a further shifting of the latching element 42 and thus of the bracket 20 contrary to the direction of insertion E is prevented. Due to the hooks 50, 52, a shifting transversely to the direction of insertion E or in the pivoting direction D to the release position is however also prevented in this fixing position, so that a detaching of the latching element 42 or of the bracket 20 is reliably excluded.

A detaching of the latching element 42 is possible only by detaching the holding elements 46, 48 by moving the latching element 42 back to the holding position. The latching element 42 can then be moved from the holding position to the release position.

The movement of the latching element 42 back to the holding position can be realized by the returning force provided by the resilient web 40 after a decrease of the tension force Z. It is however also possible to actively shift the latching element 42 to the holding position by means of a tool.

To this end, the latching element 42 is provided with a receiving means 54 which can be engaged by a tool 64 adapted to be inserted between the component 12 and the body part 10. To facilitate the insertion of the tool 64 or the centering thereof, a recess 56 is provided on the introduction surface 36, into which the tool 64 can be inserted. In the mounted state, the support structure 18 or the component 12, respectively, rests on the introduction surfaces 36, 38. The introduction surfaces 36, 38 project from the body part 10 so that a gap 66 into which the tool 64 can be introduced is formed between the component 12 and the body part 10.

As is in particular visible in FIG. 4, damping elements 58, 60 made of a softer plastic material than the housing 22 are provided on the outer surface of the housing 22. In the present case, the damping elements 58, 60 are integrated into the housing 22, but slightly project in parts from the housing 22.

The damping elements 58 arranged on the circumferential surface can compensate a play possibly present between the fastening clip 16 and the body part 10, so that the fastening clip 16 is held free of play and the generation of noise between the fastening clip 16 and the body part 10 is prevented.

The damping elements 60 at the end 25 of the housing 22 serve as a rest for the bracket 20 or the support structure 18, respectively, and can compensate a play possibly present between the fastening clip 16 and the component 12.

The fastening clip 16 is preferably manufactured using an injection-molding method. In the example embodiment shown here, the fastening clip 16 is manufactured using a two-component injection molding so that the damping elements 58, 60 are integrally joined to the housing 22.

Instead of the hooks 50, 52 shown here, the holding elements 46, 48 may also have other structures by means of which the latching element 42 is immovably retained in the fixing position. It is for example also conceivable that merely one of the holding elements 46, 48 is provided with a hook 50, 52, the respective other holding element 46, 48 being provided with a recess into which the hook 50, 52 can engage.

It is not absolutely necessary, either, to move the latching element 42 in the direction of insertion E to the fixing position. The shifting can be realized in a different direction, depending on a prevailing direction of loading, for example. However, the latching element 42 is preferably moved in a direction of loading in the fixing position so that an additional securing of the latching element 42 is realized in case of a corresponding load.

The invention claimed is:

1. A fastening clip (16) for fastening a bracket (20), in particular a metal bracket in a vehicle, the fastening clip (16) being adapted to be inserted into an opening (14) of a body part (10) and to be fixed therein, and the fastening clip (16) including a housing (22) having an insertion opening (26) and an elongated receiving space (24) for the bracket (20), and a latching element (42) being provided in the receiving space (24), which is adapted to be resiliently moved from a holding position in which the latching element (42) holds the bracket (20) in the receiving space (24), to a release position in which the bracket (20) can be inserted into the receiving space (24) or can be pulled out therefrom, and to a fixing position, corresponding holding elements (46, 48) which fix the latching element (42) in the fixing position being provided in the receiving space (24) and on the latching element (42).

2. The fastening clip according to claim 1, wherein the latching element (42) can be moved contrary to a direction of insertion (E) from the holding position to the fixing position, the holding elements (46, 48) being arranged one behind the other in the direction of insertion (E) and overlapping at least partially in the direction of insertion (E) in the holding position and in the fixing position.

3. The fastening clip according to claim 1, wherein at least one holding element (46, 48) is provided with a hook (50, 52) which projects towards the other holding element (46, 48) and which engages the respective other holding element (46, 48) when the latching element (42) is in the fixing position.

4. The fastening clip according to claim 3, wherein hooks (50, 52) engaging each other in the fixing position of the latching element (42) are provided on both holding elements (46, 48).

5. The fastening clip according to claim 4, wherein a web (40) to which the latching element (42) is resiliently and/or pivotally mounted is provided in the housing (22), the web (40) being in particular arranged in a region of the insertion opening (26).

6. The fastening clip according to claim 1, wherein introduction surfaces (36, 38), in particular introduction bevels are provided on the latching element (42) and/or on the housing (22).

7. The fastening clip according to claim 1, wherein a receiving means (54) for a tool (64) by means of which the latching element (42) can be moved from the fixing position to the holding position, or from the holding position to the release position is provided on the latching element (42).

8. The fastening clip according to claim 1, wherein the housing (26) is entirely closed in the circumferential direction and at the end (28) opposite the insertion opening (26).

9. The fastening clip according to claim 1, wherein in a region of the insertion opening (26), the fastening clip (16) has a surrounding flange (30) which projects from the housing (22) and on which a seal (32) surrounding in the circumferential direction is provided.

10. The fastening clip according to claim 1, wherein a resting surface for the bracket is provided on the insertion opening (26).

11. The fastening clip according to claim 1, wherein provided on the housing (22) are damping elements (58, 60) made of a soft plastic material.

12. The fastening clip according to claim 11, wherein the damping elements (58, 60) are at least partially integrated into a wall of the housing (22).

13. The fastening clip according to claim 1, wherein the fastening clip (16) is manufactured using an injection molding method, in particular a two-component injection molding method.

14. The fastening clip according to claim 1, wherein fastening elements (34), in particular latching projections are provided on an outer surface of the housing (22).

* * * * *